Aug. 5, 1958 A. S. DUBUAR 2,846,509

PULSE REPEATING WITH AUTOMATIC COMPENSATION FOR HIGH AND LOW RESISTANCE LOOPS

Filed Dec. 14, 1956 3 Sheets-Sheet 1

INVENTOR
A. S. DUBUAR
BY A. F. Kane
ATTORNEY

Aug. 5, 1958 A. S. DUBUAR 2,846,509

PULSE REPEATING WITH AUTOMATIC COMPENSATION FOR HIGH AND LOW RESISTANCE LOOPS

Filed Dec. 14, 1956 3 Sheets-Sheet 2

TRUNK CCT. 200

INVENTOR
A. S. DUBUAR
BY A. F. Kane
ATTORNEY

INVENTOR
A. S. DUBUAR
BY
G. F. Kane
ATTORNEY

United States Patent Office 2,846,509

Patented Aug. 5, 1958

2,846,509

PULSE REPEATING WITH AUTOMATIC COMPENSATION FOR HIGH AND LOW RESISTANCE LOOPS

Arthur S. Dubuar, Parsippany, N. J., assignor to Bell Telephone Laboratories, Incorporated, New York, N. Y., a corporation of New York Application December 14, 1956, Serial No. 628,393

5 Claims. (Cl. 179—16)

This invention relates to signaling systems and particularly to multi-office telephone systems in which signaling current pulses are employed in effecting desired switching operations to establish connections between calling and called telephone stations.

Objects of this invention are the improvement of automatic telephone systems to effect an increase in the effective range of directive signal pulse transmission and the automatic equalization of the resistance of trunks over which signal pulses are transmitted and the loop resistances of which differ widely.

In automatic telephone systems comprising a plurality of switching offices interconnected by trunks of varying length and resistance, it is necessary to provide pulse repeating means in the trunk circuits at either one or both ends of the trunk so as to prevent pulse distortion and insure satisfactory switch operations in establishing talking connections between calling and called subscriber stations. In many cases the pulse repeating means is invariably associated with the same trunk or with different trunks, the resistances of which are approximately the same. However, in other cases pulse repeating means is associated with a switch having access to trunks of widely differing resistance and in such a case faulty switch operation may result due to the widely differing pulse current amplitude between the longest and the shortest of these trunks.

This invention is a pulse repeater for repeating dial pulses over an associated trunk to directively operate automatic switches and thereby establish talking connections between calling and called subscriber lines, the repeater being arranged to test the associated trunk prior to the repeating of each train of pulses to determine the outgoing pulse loop resistance and to selectively include or exclude additional resistance in series with the trunk conductors during the repeating of a train of pulses.

A feature of the invention is a pulse repeater having a marginal relay connected in series with the conductors of a trunk over which pulses are to be repeated, this relay being effective to include additional resistance in series with the trunk conductors during the repeating of a train of switch pulses over trunks the resistance of which is below a predetermined value.

The drawings which form a part of this specification disclose a telephone system in which the invention and its features are embodied. The invention is not limited to the system shown but is generally applicable to any switching system in which directive signal current pulses are transmitted over trunks the resistances of which differ beyond the limits within which satisfactory switch operation is assured.

Referring to the drawings which consist of four figures.

Figure 1:
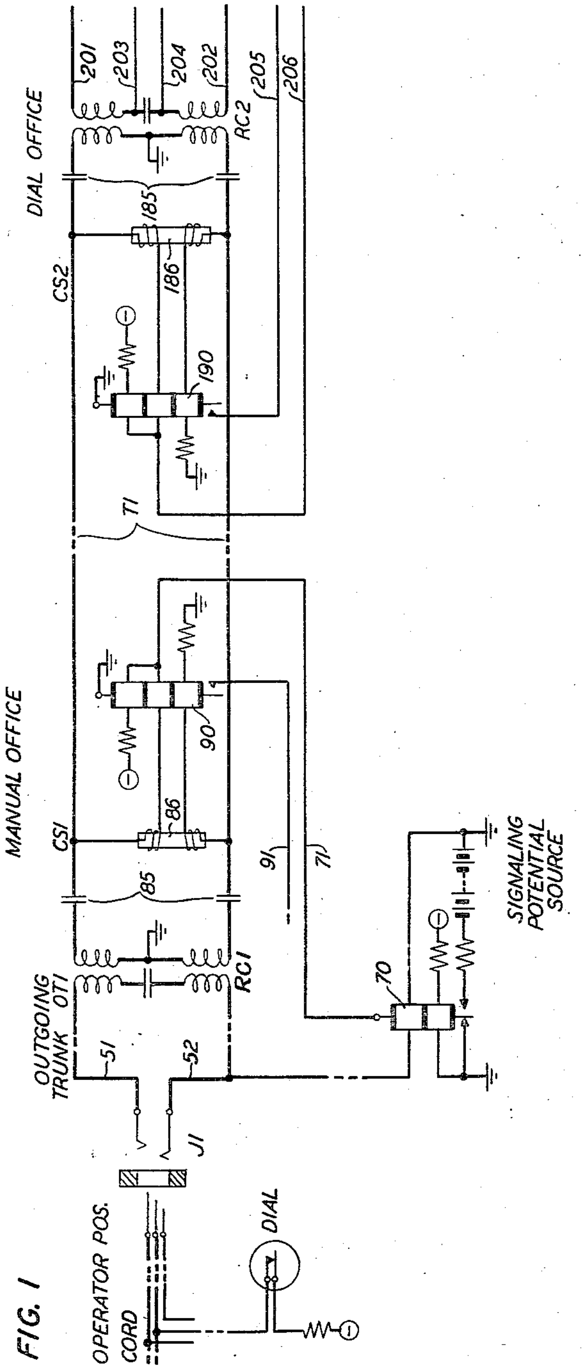
Fig. 1 shows in a manual office, a cord and dial at an operator position, a jack-ended outgoing trunk circuit OT1 and an associated signaling circuit CS1, and shows a trunk T1 extending from the manual office to a signaling circuit CS2 in a dial office.
Figure 4:
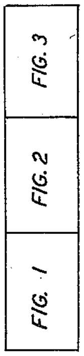
Figure 2:
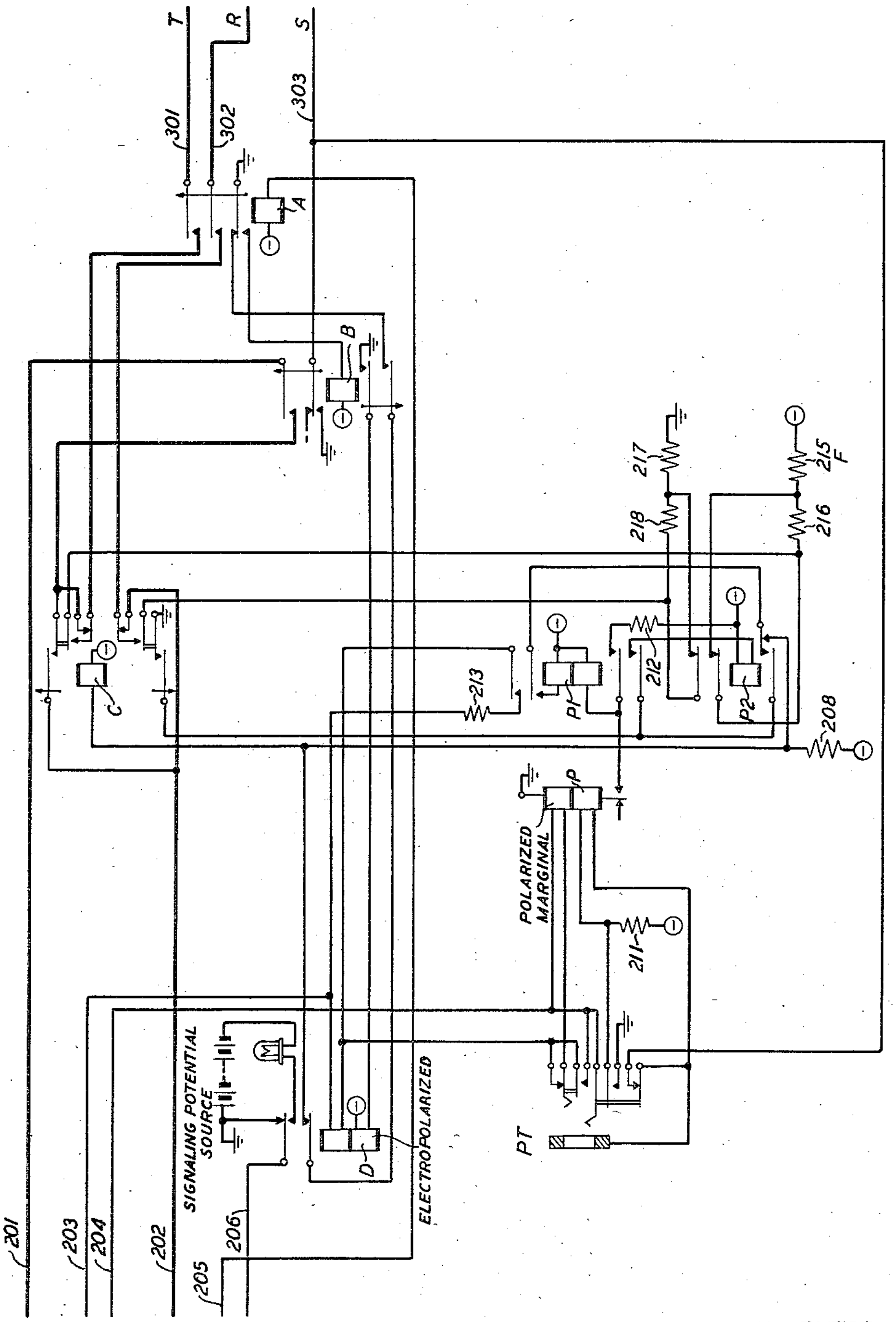
Fig. 2 shows an incoming trunk circuit 200 individually associated with the signaling circuit CS2 in the dial office.
Figure 3:
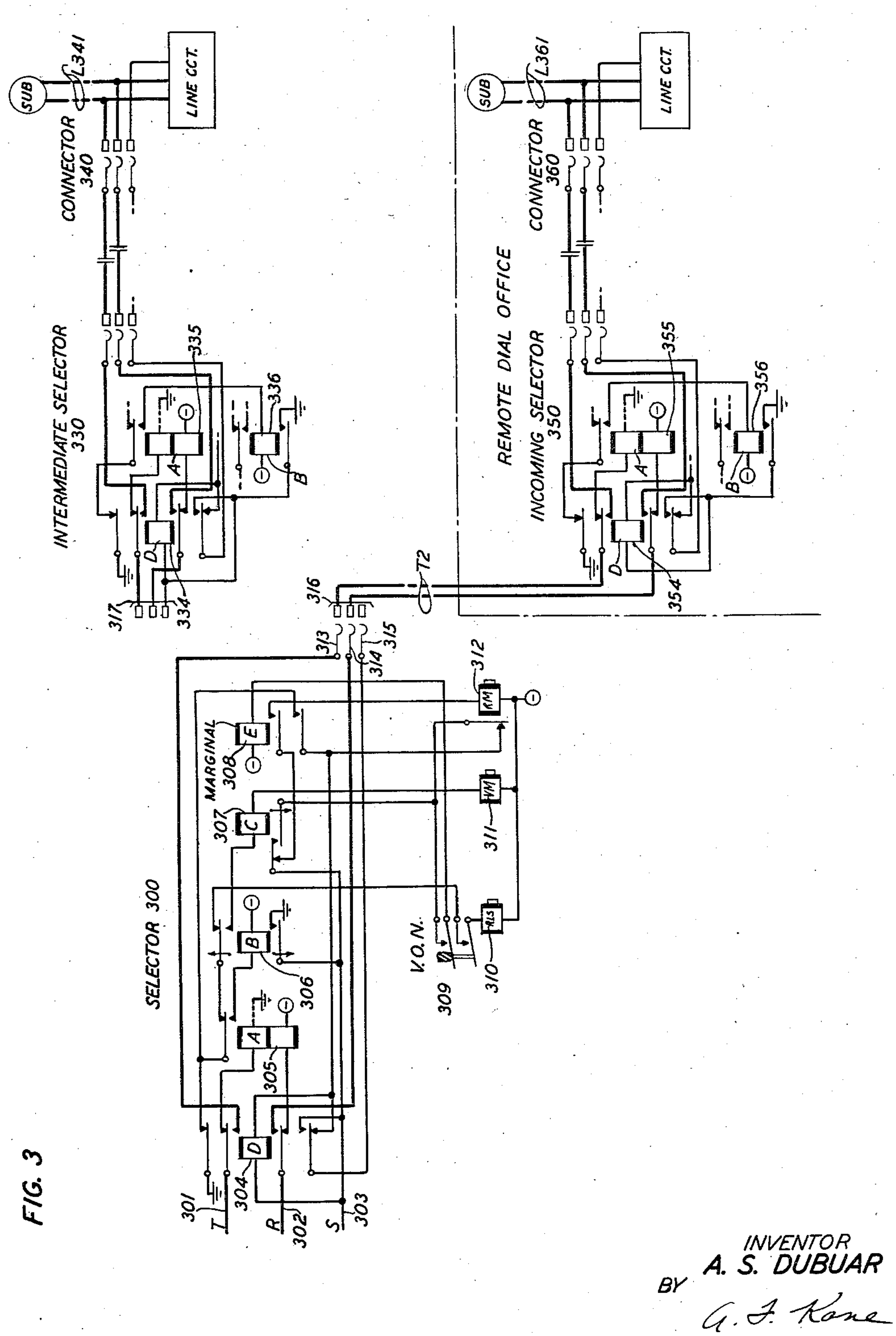

Fig. 3 shows an incoming selector 300 individually associated with the trunk circuit 200 shown in Fig. 2 and shows selector and connector switches 330 and 340 in the same office; Fig. 3 further shows a trunk T2 extending to a remote local dial office with selector switches 350 and connector switches 360 therein; and Fig. 4 shows the position in which Figs. 1, 2 and 3 are placed to represent an operative telephone system.

The manual telephone office represented in Fig. 1 is of usual design including operator positions equipped with double ended cords for completing connections between calling and called subscriber lines and interoffice trunks. Each operator position includes a dial for use in extending connections over outgoing trunks to and through other offices which include automatic switches directively operated by dial pulses. The outgoing trunk OT1 associated with jack J1 includes a repeating coil RC1 for transmitting voice currents, and a signal relay 70 controlled by the dial associated with the cord connected to jack J1. The signaling circuit CS1, which is of the type arranged for composite signaling, includes capacitors 85 for transmitting voice currents and a signaling relay 90, the windings of which are connected through an impedance coil 86 to the conductors of trunk T1. The signaling circuit CS2, terminating trunk T1 in the dial office similarly includes capacitors 185 for transmitting voice currents and a signaling relay 190 connected through an impedance coil 186 to the conductors of trunk T1 for response to signals transmitted by relay 70 in the manual office. The upper winding of each of relays 90 and 190 is a biasing winding which normally holds the armature in the position shown in the drawing. The middle winding of each of relays 90 and 190 is connected in series with the upper conductor of trunk T1 for operative energization responsive to signals transmitted from the distant end of the trunk; and the lower winding of each of these relays is connected in series with the lower conductor of the trunk to compensate for any difference in ground potential between the ends of the trunk.

The operator position, dial and cord circuits and the trunk circuit OT1 and associated signal circuits CS1 and CS2 may be similar to those completely shown in Figs. 1, 2, 3 and 4 and described in the specification of Patent 2,208,765 granted to R. E. King et al. July 23, 1940.

The selector and connector switches 300, 330, 340, 350 and 360 shown in Fig. 3 are of the two-motion step-by-step type, the structure and operation of which are generally described in the second edition of "Automatic Telephony" by Smith and Campbell, published in 1921, pages 53 to 65, inclusive. The selector 300 is represented by control relays 304 to 308, inclusive, vertical off-normal springs 309, release magnet 310, vertical stepping magnet 311, rotary stepping magnet 312, a set of terminal bank wipers 313, 314 and 315 and two sets of terminals 316 and 317. Each of the selectors 330 and 350 is represented by a set of wipers, two of the control relays and a single set of terminals; and each of the connectors 340 and 360 is represented by only the wipers and a single set of terminals, all other associated circuit elements being omitted. The terminals in the banks of the connectors are connected to subscriber lines and stations as represented by lines L341 and L361.

Assume now that an operator in the manual office connects the plug of a cord to jack J1 to extend a call over trunk T1 to the trunk circuit 200 in a dial office. The signal relay 70 is thereupon operated by energization of its upper winding as described in detail in the aforementioned R. E. King et al. patent. When relay 70 operates responsive to insertion of the plug of a cord in jack J1, it disconnects ground potential from and connects negative signaling potential to and through the middle winding of relay 90 to the upper conductor of trunk T1 thereby causing the operation of the signaling relay 190 of signaling circuit CS2 in the dial office without operating signaling relay 90. The operation of relay 190 connects ground potential to conductor 205 causing the operation of the line relay A of trunk circuit 200. The operation of relay A of trunk circuit 200 closes a circuit for operating the slow-to-release relay B. The operation of relay B connects ground potential to the sleeve conductor 303 of selector 300; closes a circuit for energizing the lower biasing winding of supervisory relay D; and closes a circuit for energizing the lower biasing winding of polarized relay P. The operation of relays A and B closes a circuit for operating the line relay 305 of the associated selector 300, this circuit being traced from battery through the lower winding of relay 305, a back contact of relay 304, conductor 302, middle upper front contact of trunk circuit relay A, back contact of the lower make-before-break springs of relay C, conductor 202, lower right winding of repeating coil RC2, conductor 204, upper winding of marginal relay P, a back contact of test jack PT, upper winding of relay D, conductor 203, upper right winding of repeating coil RC2, conductor 201, a front contact of relay B, back contact of the upper make-before-break springs of relay C, outer front contact of relay A, conductor 301, inner upper back contact of selector relay 304, and through the upper winding of relay 305 to ground. The selector line relay 305 operates and so also does the marginal relay P of the trunk circuit since the selector 300 is in the same office as trunk circuit 200 and the resistance of conductors 301 and 302 is low; but supervisory relay D does not operate since the energization of its upper winding is opposed by the energization of its biasing winding. The operation of relay P causes the operative energization of the lower winding of relay P1; and the operation of relay P1 connects resistor 213 in parallel with the upper winding of relay D to assure the non-operation of relay D prior to or during the repeating of pulses by relay A. The operation of relay 305 of selector 300 closes a circuit for operating the slow-to-release relay 306; and the operation of relay 306 connects ground potential to sleeve conductor 303, this conductor having been previously connected to ground potential as a busy indicating condition by operation of relay B of trunk circuit 200, as hereinbefore described.

When the operator in the manual office dials the first digit of the called subscriber's directory number, relay 70 is alternately released and reoperated as many times in succession as there are pulses in the digit train. Each release of relay 70 disconnects the signaling potential from and connects ground potential through the middle winding of relay 90 to the upper conductor of trunk T1; and each reoperation of relay 90 disconnects ground potential from and reconnects the signaling potential to the winding of relay 90 and upper conductor of trunk T1. Thus each pulse in the train of pulses created by the dialing of the first digit effects the release and reoperation of the signaling relay 190 in the dial office; and each release and reoperation of relay 190 causes a similar release and reoperation of relay A of trunk circuit 200. The dialing of each succeeding digit of the called subscriber's number effects the transmission of a corresponding train of impulses to alternately release and reoperate signaling relay 190 and relay A of trunk circuit 200.

Following seizure of trunk circuit 200 and operation of relays A, B, P and P1 of trunk circuit 200, the release of relay A responsive to the first pulse of a digital train opens the circuit through conductors 301 and 302 to effect release of relay 305 of selector 300 and release of relay P. The release of relay A also causes the operation of relay C and closes a holding circuit through the upper winding of relay P1. The operation of relay C closes a short circuit across conductors 201 and 202 and the right windings of repeating coil RC2 and the upper windings of relays D and P, thereby causing the release of relay P and preventing any false operation of relay D due to surges at the beginning or end of the transmission of a digital train of pulses. Relay P1 connects its lower winding in parallel with resistor 212, thereby making relay P1 slow in releasing to assure the energization of its holding winding prior to deenergization of its lower winding upon release of relay P. The reoperation of relay A, at the end of the first pulse, opens the circuit through the winding of relay C, but relay C is slow in releasing so that it remains operated during the response of relay A to a train of pulses and until after relay A has reoperated at the end of the last pulse of a digital train. Being slow in releasing, relay B also remains operated during the response of relay A to dial pulses. The operation of relay C also completes a circuit, including the outer lower front contact of relay P1, for operatively energizing the winding of relay P2. The operation of relay P2 opens the normally closed short circuits across resistors 216 and 218 thereby to include these resistors in series with conductors 301 and 302 each time relay A reoperates during its response to a train of dial pulses. The operation of relay P2 transfers the upper winding of relay P1 to ground at the front contact of relay C so that both of relays P1 and P2 are held operated until after relay C releases at the end of the train of pulses.

When relay A reoperates at the end of each pulse of a digital train, it recloses separate circuits over conductors 301 and 302 for reoperating relay 305 of selector 300. The circuit for energizing the upper winding of relay 305 includes conductor 301, the front contact of the upper continuity spring of relay C and resistors 216 and 215; and the circuit for energizing the lower winding of relay 305 includes conductor 302, the front contact of the lower continuity spring of relay C and resistors 218 and 217. The energization of the windings of relay 305 in separate circuits renders relay 305 fast in operating, thereby to insure the operative response of selector 300 to each impulse of a train. Each release and reoperation of relay A, responsive to a first train of dial pulses, thus causes a corresponding release and reoperation of relay 305.

The first release of relay 305 closes a circuit for operatively energizing vertical-stepping magnet 311 and relay 307 in series. The operation of stepping magnet 311 raises the brushes 313, 314 and 315 up one step. The vertical off-normal springs 309 are actuated when the brushes move out of normal position thereby closing a circuit for operatively energizing the winding of relay 308, this circuit including the upper contact of springs 309, the front contact of relay 307 and a front contact of relay 306. The reoperation of relay 305 at the end of a pulse releases stepping magnet 311. Being slow in releasing, relay 306 remains operated while relay 305 is released by each dial pulse and relay 307 remains operated while relay 305 is reoperated between pulses. Each succeeding release and reoperation of relay 305 responsive to dial pulses effects a reoperation and release of stepping magnet 311, thereby raising the brushes up to the level of the bank corresponding to the number of pulses in the digit train. The reoperation of relay A at the end of the last pulse of a train causes the release of relay C. With relay C released, the short circuit across the upper windings of relays D and P is opened; and the windings of relay 305 of selector 300 are again connected in series with the upper windings of relays D and P while the selector 300 is hunting for an idle trunk in the group connected to terminals in the selected level of the bank, so that relay P is reoperated. The trunks in this group may be local trunks leading to intermediate selectors in the same dial office, or may be interoffice trunks connecting to incoming selectors in an adjacent dial office or to incoming selectors in a remote dial office.

When relay 307 releases following the reoperation of relay 305 after the last pulse of the train, relay 308 is held operated in a circuit path which includes the back contact of stepping magnet 312, the lower front contact of relay 308 and a back contact of relay 304; and the rotary-stepping magnet 312 is operatively energized in a circuit including the inner front contact of relay 308, the back contact of relay 307 and the lower front contact of relay 306. The operation of stepping magnet 312 rotates the brushes 313, 314 and 315 into engagement with the first set of contacts in the previously selected level of the associated terminal bank. The operation of stepping magnet 312 causes the release of relay 308 and the release of relay 308 causes the release of stepping magnet 312.

Assume now that the called line is a line such as L341 terminating in the same dial office which includes trunk circuit 200 and selector 300 and that the brushes 313, 314 and 315 are in contact with the first set of terminals in a level which includes terminals 317 connected by a local trunk to intermediate selector 330. Assume further that the first set of terminals (not shown) are connected to a local trunk leading to a busy intermediate selector. In this case the ground potential encountered on the terminal engaged by brush 315 is connected through brush 315, a back contact of relay 304, back contact of stepping magnet 312, and upper contact of springs 309 to the winding of relay 308, thereby causing the reoperation of relay 308 and stepping magnet 312 in succession; whereby the brushes are advanced step-by-step until an idle set of terminals are encountered, which we will assume are the terminals 317 connected to intermediate selector 330. On engagement of brushes 313, 314 and 315 with the terminals of a local trunk connecting to an idle selector 330, there is no ground potential connected to the terminal engaged by brush 315 so that relay 308 is not reoperated. The release of stepping magnet 312, after engagement of the brushes with an idle set of terminals, closes a circuit for operating relay 304, this circuit including the winding of relay 308, upper contact of springs 309, back contact of stepping magnet 312, winding of relay 304 and lower contact of relay 306. Being marginal, relay 308 does not operate in series with relay 304. The operation of relay 304 disconnects conductors 301 and 302 from the windings of relay 305 and connects these conductors through brushes 313 and 314 and the engaged terminals and through the local trunk connected to these terminals to the windings of the line relay 335 of selector 330. This selector is similar to the selector 300 and both windings of relay 335 are energized in series with the upper windings of relays D and P of trunk circuit 200; and relays 305 and 306 release in succession. The operation of relay 335 causes the operation of relay 336; and relay 336 connects ground potential to the terminal engaged by brush 315.

Since the selector 330 is in the same office as trunk circuit 200, the resistance included in the circuit for operating relay 335 is low; and the operations of relays P, P1, C and P2 during the transmission of the pulses corresponding to the second digit of the called number to relay 335 are the same as during the transmission of the pulses corresponding to the first digit to relay 305. Thus the resistors 216 and 218 are included in series with the conductors 301 and 302 and the windings of relay 335. The selector 330 is thereby operated to select a level corresponding to the second digit of the called number and to extend the connection to an idle connector 340 having terminals to which the called line L341 is connected. The dial pulses corresponding to the last two digits of the called number are likewise transmitted to control the operation of the connector stepping magnets to select and connect with the called line in usual and well-known manner, the P, P1 and P2 relays again being operated to effect the inclusion of resistors 216 and 218 in series with conductors 301 and 302 and the windings of the line relay (not shown) of the connector 340. Assuming the called line to be idle and that the call is answered, the answering supervisory relay (not shown) in the connector 340 is operated to effect a reversal of the current through the windings of relays D and P, whereby the energization of the upper winding of relay D in the same direction as the energization of the polarizing winding causes the operation of relay D. The operation of relay D disconnects ground from conductor 206, thus causing the operation of signaling relay 90 at the manual office thereby to indicate answer of the call by connecting ground potential to signaling conductor 91. If and when the called subscriber replaces the telephone on the hook, the supervisory relay in the connector releases, thus reversing the current through the upper winding of relay D to its original direction; wherefore relay D releases causing the release of signaling relay 90 in the manual office.

When the operator disconnects the cord from jack J1, relay 70 releases, thereby disconnecting signaling potential from and reconnecting ground potential to conductor 71 to cause the release of signaling relay 190 in the dial office. The release of relay 190 causes the successive release of relays A and B of trunk circuit 200. The release of relay A causes the release of the line relay (not shown) of the connector 340; and the release of relay B disconnects ground potential from conductor 303, causing the release of relay 304 of selector 300 and the release of relay 334 of selector 330. The release of relay 304 causes the operation of release magnet 310 and the return of the brushes 313, 314 and 315 to normal, springs 309 being restored when the brush shaft reaches normal position at which time release magnet 310 releases all in usual and well-known manner. The selector 330 and connector 340 are also restored to normal in usual manner.

Assume next that the called line is a line such as L361 terminating in a different and remote dial office. In such a case the first digit dial pulses are effective to selectively operate selector 300 in the manner above described, the selected level of terminals being one which includes terminal set 316 and to which interoffice trunks, such as trunk T2, are connected. Each of these trunks is connected to an incoming selector such as selector 350 in the remote office, the selector 350 being similar to the selector 300. Upon seizure of trunk circuit T2, relay 304 of selector 300 operates and the windings of the line relay 355 of selector 350 are energized in series with the conductors of trunk T2, conductors 301 and 302 and the upper windings of relays D and P in trunk circuit 200. Trunk T2 is a long, high-resistance trunk so that the current through the upper winding of relay P is insufficient to maintain its operation; and the release of relay P causes the release of relays P1 and P2 so that resistors 216 and 218 are short-circuited and the current in the separate circuits closed over conductors 301 and 302 is sufficient to assure the response of relay 355 to the dial pulses corresponding to the second digit dialed by the operator in the manual office. Upon extension of the connection to a connector 360 having access to the called line, the dial pulses for the last two digits of the called number are repeated by relay A of trunk circuit 200 to the line relay (not shown) of the connector. The current through the upper winding of relay P during the interdigital interval is insufficient to effect the operation of this relay; so that relays P1 and P2 are not operated, and resistors 216 and 218 are short-circuited and are not included in the circuit for reoperating the line relay of the connector at the end of each dial pulse. The further operations involved in connecting with the line L361 and in releasing the connection are similar to those described above on a call to line L341.

Thus the system above described includes a dial pulse repeating arrangement in trunk circuit 200 arranged to test the outgoing loop resistance prior to the repeating of each digital train of pulses and to include resistors 216 and 218 in the pulse repeating circuits when the outgoing loop resistance is less than a certain value and to exclude these resistors when the outgoing loop resistance is equal to or greater than said certain value. Thus correct and satisfactory switch operations are assured with both low resistance and high resistance trunks.

What is claimed is:

1. In a telephone switching system, an incoming trunk, low resistance outgoing trunks and high resistance outgoing trunks, switching means for selectively connecting said incoming trunk to any one of said outgoing trunks, a relay connected for response to signal pulses incoming over said incoming trunk, pulse responsive means remotely connected to each outgoing trunk, said relay having contacts for repeating the received pulses to the pulse responsive means of any outgoing trunk to which said incoming trunk is connected, a resistor and a test relay in series with said relay contacts and the conductors of a connected outgoing trunk, said test relay being operatively responsive to connection in series with said pulse responsive means of a low resistance outgoing trunk and non-responsive to connection in series with said pulse responsive means of a high resistance outgoing trunk, and means controlled by said test relay for short-circuiting said resistor.

2. In combination, a pulse repeater comprising a pulsing relay, an incoming pulsing circuit controlling the operation of said relay, selector switches each comprising pulse responsive means controlling selective operation, means for connecting said repeater to any one of said switches, the means for connecting said repeater to one of said switches comprising conductors having a low resistance and the means for connecting said repeater to another of said switches comprising conductors having a relatively high resistance, a test relay, means including contacts of said pulsing relay for connecting the operating winding of said test relay in series with said connecting means and the pulse responsive means of the connected switch, said test relay being operatively energized responsive to connection in series with said low resistance conductors and non-operatively energized responsive to connection in series with said relatively high resistance conductors, a resistor in said repeater, and means enabled by operation of said test relay and rendered effective by said pulsing relay for including said resistor in series with said connecting means and the pulse receiving means of the connected switch.

3. In combination, a pulse repeater comprising a pulsing relay, an incoming pulsing circuit controlling said pulsing relay, selector switches, each switch comprising pulse receiving means controlling selective operation of the switch, means for connecting said repeater to any one of said switches, the resistance of the connection being low to one and relatively high to another of said switches, a test relay, means including contacts of said pulsing relay connecting the winding of said test relay in circuit with the pulse receiving means of the particular switch to which the repeater is connected, said test relay being operatively energized only when included in a low resistance connection to one of said switches, a resistor, means enabled by operation of said test relay and effective upon receipt of the first pulse of a switch operating train of pulses for connecting said resistor in series with said contacts of said pulsing relay and the pulse receiving means of the associated switch.

4. In a switching system comprising selector switches directly operated by trains of dial pulses, a pulse repeater comprising a pulsing relay controlled by an incoming pulsing circuit, means for connecting said repeater to any one of said switches, pulse receiving means for each switch, a marginal test relay, a test circuit including the winding of said test relay and contacts of said pulsing relay and the pulse receiving means of the switch to which the repeater is connected, said test relay being operatively energized only if the resistance of said circuit is less than a predetermined value, means rendered effective by release of said pulsing relay responsive to the first pulse of an incoming train of pulses for short-circuiting said test relay, a resistor, and means rendered effective by operation of said test relay for including said resistor in series with said contacts of the pulsing relay and the pulse receiving means of the switch to which the train of pulses are repeated.

5. In a switching system, an outgoing pulse repeater comprising a pulsing relay, a pulsing circuit incoming to said pulsing relay, trunks, means for operatively associating said repeater with any one of said trunks, some of said trunks being low resistance trunks and others of said trunks being high resistance trunks, pulse receiving means for each trunk connected to the end thereof remote from said repeater, a test relay, contacts closed by operation of said pulsing relay connecting said test relay in series with the pulse receiving means of any trunk with which the repeater is operatively associated, said test relay being operatively energized responsive to connection to a low resistance trunk and non-operatively energized responsive to connection to a high resistance trunk, relay means actuated responsive to release of said pulsing relay by the first pulse of a train for short-circuiting said test relay, a resistor, and means rendered effective by operation of said relay means while said test relay is operated for including said resistor in series with contacts of said pulsing relay and the pulse receiving means of the trunk to which the repeater is connected during the repeating of a train of pulses by said pulsing relay.

No references cited.